U S012418222B2

(12) United States Patent
Kim

(10) Patent No.: US 12,418,222 B2
(45) Date of Patent: Sep. 16, 2025

(54) ELECTRONIC CONTROL UNIT FOR REDUNDANCY OF MOTOR DRIVEN POWER STEERING FOR VEHICLE

(71) Applicant: HYUNDAI MOBIS CO., LTD., Seoul (KR)

(72) Inventor: Min Gu Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 787 days.

(21) Appl. No.: 17/724,705

(22) Filed: Apr. 20, 2022

(65) Prior Publication Data
US 2023/0198348 A1 Jun. 22, 2023

(30) Foreign Application Priority Data

Dec. 21, 2021 (KR) .......... 10-2021-0183612

(51) Int. Cl.
H02K 11/33 (2016.01)
B60R 16/023 (2006.01)
B62D 5/04 (2006.01)
H02K 3/50 (2006.01)
H02K 5/22 (2006.01)
H02K 9/22 (2006.01)

(52) U.S. Cl.
CPC .......... H02K 11/33 (2016.01); B60R 16/0231 (2013.01); B62D 5/046 (2013.01); H02K 3/50 (2013.01); H02K 5/225 (2013.01); H02K 9/227 (2021.01); H02K 2203/09 (2013.01); H02K 2211/03 (2013.01); H02K 2213/06 (2013.01)

(58) Field of Classification Search
CPC ........ H02K 11/33; H02K 11/30; H02K 11/38; H02K 3/50; H02K 5/225; H02K 9/227; H02K 2203/09; H02K 2213/06; H02K 2211/03; B60R 16/0231; B60R 16/02; B62D 5/046
USPC ............................................ 310/68 R, 64, 71
See application file for complete search history.

(56) References Cited

U.S. PATENT DOCUMENTS

2016/0355210 A1* 12/2016 Inada ................. H05K 7/20854
2018/0178739 A1* 6/2018 Fujimoto ............. B60R 16/027
2018/0178829 A1 6/2018 Fujimoto
2020/0391785 A1* 12/2020 Kim ...................... H02K 11/33

FOREIGN PATENT DOCUMENTS

KR 10-1072749 B1 10/2011
KR 10-2018-0023997 A 3/2018

OTHER PUBLICATIONS

Korean Office Action issued on Oct. 31, 2023, in counterpart Korean Patent Application No. 10-2021-0183612 (4 pages in Korean).

* cited by examiner

Primary Examiner — Alexander A Singh
(74) Attorney, Agent, or Firm — NSIP Law

(57) ABSTRACT

An electronic control unit for redundancy of a motor driven power steering for a vehicle includes: a first motor control circuit unit having a circuit structure to control an operation of a motor; a second motor control circuit unit having a circuit structure to control the operation of the motor, and disposed in parallel to the first motor control circuit unit along an x-direction; and a redundancy control unit to control the second motor control circuit unit to perform a motor control, when an abnormality occurs in the first motor control circuit unit.

19 Claims, 10 Drawing Sheets

ELECTRONIC CONTROL UNIT FOR REDUNDANCY OF MOTOR DRIVEN POWER STEERING FOR VEHICLE

CROSS-REFERENCE TO RELATED APPLICATION

This application claims priority from and the benefit of Korean Patent Application No. 10-2021-0183612, filed on Dec. 21, 2021, which is hereby incorporated by reference for all purposes as if set forth herein.

BACKGROUND

Field

Exemplary embodiments of the present disclosure relate to an ECU (Electronic Control Unit) for redundancy of an MDPS (Motor Driven Power Steering) for a vehicle, and more particularly, to an ECU for redundancy of an MDPS for a vehicle, which controls the operation of a motor to generate a driving force of an MDPS for a vehicle.

Discussion of the Background

In general, an ECU of an MDPS for a vehicle has a structure in which one motor control circuit unit for controlling the operation of a motor is connected to a vehicle-side power supply, a CAN (Controller Area Network) line, and a torque sensor.

The motor control circuit unit is a main circuit unit of the ECU for controlling the operation of the motor which generates a driving force of the MDPS. When the motor control circuit unit fails, the motor may lose the driving force, and the MDPS may not be normally operated, and may put a driver in danger.

Recently, the development of autonomous vehicles has been conducted with the aim of fully autonomous driving. Thus, various attempts are made to further reinforce the operation stability of the MDPS. However, when the motor control circuit unit fails, the conventional MDPS has no device capable of taking place of the motor control circuit unit. Thus, the conventional MDPS has limitations in securing the stability of autonomous driving.

Therefore, there is a need for a device capable of solving the problem.

The related art of the present disclosure is disclosed in Korean Patent No. 10-1072749 registered on Oct. 5, 2011 and entitled "Electronic Control Unit of Electric Power Steering Apparatus."

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an ECU (Electronic Control Unit) for redundancy of an MDPS (Motor Driven Power Steering) for a vehicle includes: a first motor control circuit unit having a circuit structure configured to control an operation of a motor; a second motor control circuit unit having a circuit structure configured to control the operation of the motor, and disposed in parallel to the first motor control circuit unit in an x-direction; and a redundancy control unit configured to control the second motor control circuit unit to perform a motor control, when an abnormality occurs in the first motor control circuit unit.

The first motor control circuit unit may include: a first circuit board having a circuit structure configured to independently control the operation of the motor; a first power terminal connection part disposed in a first area of the first circuit board, and connected to a power terminal part connected to a vehicle-side power connector to receive power; a first communication terminal connection part disposed in a second area of the first circuit board, and connected to a CAN terminal part connected to a vehicle-side CAN connector to receive a signal; and a first sensor terminal connection part disposed in a third area of the first circuit board, and connected to a torque sensor terminal part connected to a vehicle-side torque sensor connector to receive a signal.

The second motor control circuit unit may include: a second circuit board having a circuit structure configured to independently control the operation of the motor; a second power terminal connection part disposed on an x-direction extension line of a first area of the second circuit board, and connected to the power terminal part to receive power; a second communication terminal connection part disposed on an x-direction extension line of a second area of the second circuit board, and connected to the CAN terminal part to receive a signal; and a second sensor terminal connection part disposed on an x-direction extension line of a third area of the second circuit board, and connected to the torque sensor terminal part to receive a signal.

The redundancy control unit may include: a circuit detection part configured to detect an operation state of the first motor control circuit unit; an abnormality determination part configured to determine whether the first motor control circuit unit is abnormal, according to a signal detected by the circuit detection part; and a driving circuit switching part configured to stop the operation of the motor by the first motor control circuit unit, and perform circuit switching such that the second motor control circuit unit controls the operation of the motor, when the abnormality determination part determines that the first motor control circuit unit is abnormal, while the first motor control circuit unit controls the motor.

The circuit detection part may include: a first circuit detector configured to detect the operation state of the first motor control circuit unit; and a second circuit detector configured to detect an operation state of the second motor control circuit unit, wherein the abnormality determination part is configured to determine whether the first circuit detector is abnormal, by comparing detection signals of the first and second circuit detectors or by comparing the detection signal of the first circuit detector to a preset value.

The ECU may further include a motor coupling unit coupled to a motor housing, and disposed between the first and second motor control circuit units.

The motor coupling unit may include: a board support part fixed to the first and second motor control circuit units, and configured to receive heat radiated from the first and second motor control circuit units; and a heat radiation support part connected to the board support part, and configured to radiate heat received from the board support part.

The board support part may include: a support body part; a first board support part disposed on a first surface of the support body part, such that the first motor control circuit unit abuts the first board support part; a second board support part disposed on a second surface of the support body part, such that the second motor control circuit unit abuts the second board support part; and a terminal through-hole disposed through the support body part, such that a power terminal part connected to a vehicle-side power connector, a CAN terminal part connected to a vehicle-side CAN connector, and a torque sensor terminal part connected to a vehicle-side torque sensor connector are extended through the terminal through-hole in the x-direction.

The board support part may include: a support body part; a contact support part disposed on a first surface of the support body part, such that one of the first and second motor control circuit units abuts the contact support part; and a spacing support part protruding from the contact support part in the x-direction, and configured to support the other of the first and second motor control circuit units.

The ECU may further include a double-layer power terminal part having a first side connected to a vehicle-side power connector and a second side diverging into double layers, extended in the x-direction, and connected to the first motor control circuit unit and the second motor control circuit unit.

The double-layer power terminal part may include: an external power connection part connected to the vehicle-side power connector; a first-layer power connection part extended from the external power connection part in the x-direction, and connected to one of the first and second motor control circuit units; and a second-layer power connection part extended in the x-direction from a position spaced apart from the first-layer power connection part, and connected to the other of the first and second motor control circuit units.

The first-layer power connection part may protrude in the x-direction from a first side of the external power connection part, and have a first end connected to the first motor control circuit unit. The second-layer power connection part may include: a power diverging part formed on a second side of the external power connection part to protrude in one of a y-direction and a z-direction; a power middle extension part extended in the other of the y-direction and the z-direction from the power diverging part; and a power extension end part extended in the x-direction from the power middle extension part, and having an end spaced apart from the first end of the first-layer power connection part in the x-direction, the y-direction and the z-direction.

The double-layer power terminal part may include: a first bus bar having the external power connection part, the first-layer power connection part and the second-layer power connection part; a second bus bar disposed symmetrically with the first bus bar in a y-direction; and an intersection space defined between the first and second bus bars, such that at least a part of a CAN terminal part connected to a vehicle-side CAN connector is disposed in the intersection space.

The ECU may further include a double-layer CAN terminal part having a first side connected to a vehicle-side CAN connector and a second side diverging into double layers, extended in the x-direction, and connected to the first and second motor control circuit units. The double-layer CAN terminal part may include: an external CAN connection part connected to the vehicle-side CAN connector; a second-layer CAN connection part extended in the x-direction from the external CAN connection part, and connected to one of the first and second motor control circuit units; and a first-layer CAN connection part diverging in a y-direction or a z-direction from the external CAN connection part and extended in the x-direction, and connected to the other of the first and second motor control circuit units.

The second-layer CAN connection part may be formed on a first side of the external CAN connection part to extend in the x-direction, and have a first end connected to the second motor control circuit unit. The first-layer CAN connection part may include: a CAN diverging part disposed on a second side of the external CAN connection part to protrude in one of the y-direction and the z-direction; a CAN middle extension part extended in the other of the y-direction and the z-direction from the CAN diverging part; and a CAN extension end part extended in the x-direction from the CAN middle extension part, and having a first end spaced apart from the first end of the second-layer CAN connection part in the x-direction, the y-direction and the z-direction.

The ECU may further include a double-layer sensor terminal part having a first side connected to a vehicle-side torque sensor connector and a second side diverging into double layers, extended in the x-direction, and connected to the first and second motor control circuit units. The double-layer sensor terminal part may include: an external sensor connection part connected to the vehicle-side torque sensor connector; a first-layer sensor connection part diverging in the x-direction from the external sensor connection part, and connected to one of the first and second motor control circuit units; and a second-layer sensor connection part diverging in a y-direction or z-direction from the external sensor connection part and extended in the x-direction, and connected to the other of the first and second motor control circuit units.

The first-layer sensor connection part may be formed on a first side of the external sensor connection part to extend in the x-direction, and have a first end connected to the first motor control circuit unit. The second-layer sensor connection part may include: a sensor diverging part disposed on a second side of the external sensor connection part to protrude in one of the y-direction and the z-direction; a sensor middle extension part extended in the other of the y-direction and the z-direction from the sensor diverging part; and a sensor extension end part extended in the x-direction from the sensor middle extension part, and having a first end spaced apart from the first end of the first-layer sensor connection part in the x-direction, the y-direction and the z-direction.

In another general aspect, an ECU for redundancy of an MDPS for a vehicle may include: a motor coupling unit coupled to a motor; a first motor control circuit unit installed on the motor coupling unit; a second motor control circuit unit installed on the motor coupling unit, and disposed in parallel to the first motor control circuit unit along an x-direction; a power connector having a first side connected to a vehicle-side power connector and a second side connected to the first and second motor control circuit units; and a redundancy control unit configured to control the second motor control circuit unit to perform a motor control, when an abnormality occurs in the first motor control circuit unit.

The power connector may include: a double-layer power terminal part having a bus bar structure in which a first side thereof is connected to the vehicle-side power connector and a second side thereof diverges into double layers, extended in the x-direction, and connected to the first and second motor control circuit units; a CAN terminal part connected to a vehicle-side CAN connector; and a first insert molding part configured to connect the double-layer power terminal part to the CAN terminal part through insert molding, and installed on the motor coupling part.

The CAN terminal part may include a double-layer CAN terminal part having a bus bar structure in which a first side thereof is connected to the vehicle-side CAN connector and a second side thereof diverges into double layers, extended in the x-direction, and connected to the first and second motor control circuit units. At least a part of a first area in which the double layer power terminal part is disposed and at least a part of a second area in which the double-layer CAN terminal part is disposed may cross or overlap each other.

The ECU may further include a torque sensor connector connected to a vehicle-side torque sensor connector. The torque sensor connector may include: a double-layer sensor terminal part having a bus bar structure in which a first side thereof is connected to the vehicle-side torque sensor connector and a second side thereof diverges into double layers, extended in the x-direction, and connected to the first and second motor control circuit units; and a second insert molding part formed by insert molding the double-layer sensor terminal part, and fitted and installed into the motor coupling unit in the x-direction.

Other features and aspects will be apparent from the following detailed description, the drawings, and the claims.

DETAILED DESCRIPTION OF THE ILLUSTRATED EMBODIMENTS

Hereinafter, an ECU (Electronic Control Unit) for redundancy of an MDPS (Motor Driven Power Steering) for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
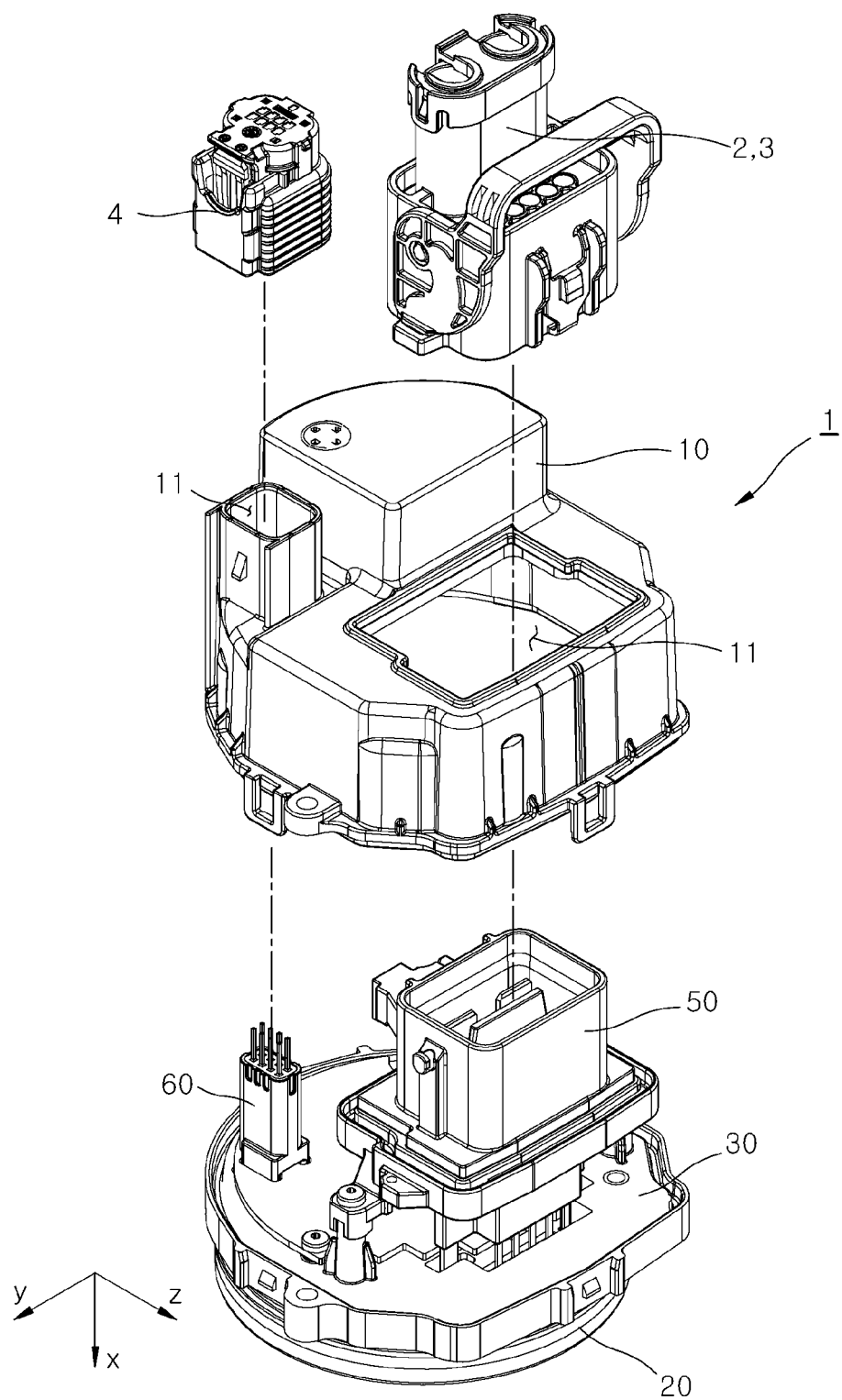
FIG. 1 is an assembled view illustrating main parts of an ECU (Electronic Control Unit) for redundancy of an MDPS (Motor Driven Power Steering) for a vehicle in accordance with an embodiment of the present disclosure.
Figure 2:
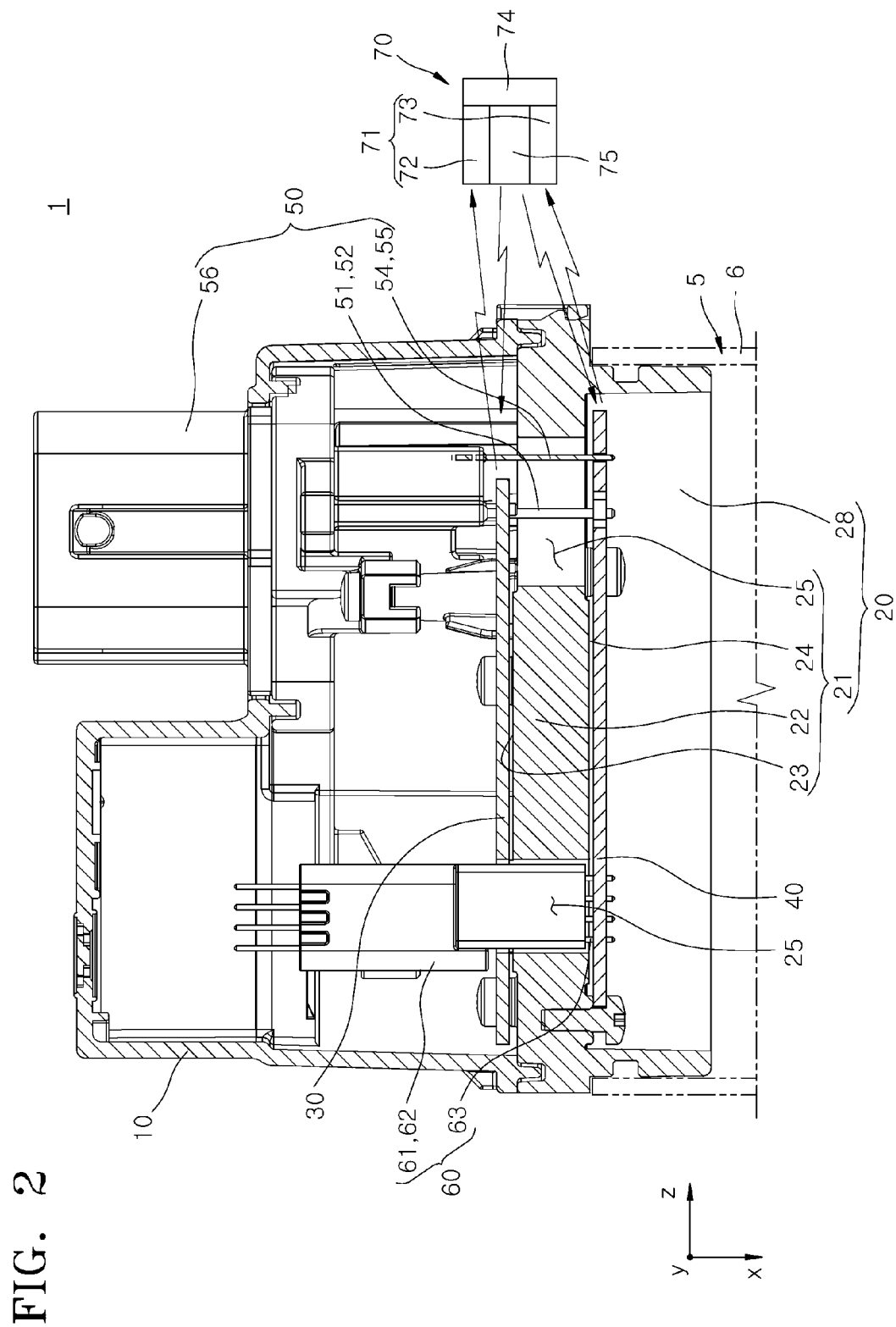
FIG. 2 is a cross-sectional view illustrating the main parts of the ECU for redundancy of an MDPS for a vehicle in accordance with the embodiment of the present disclosure.
Figure 3:
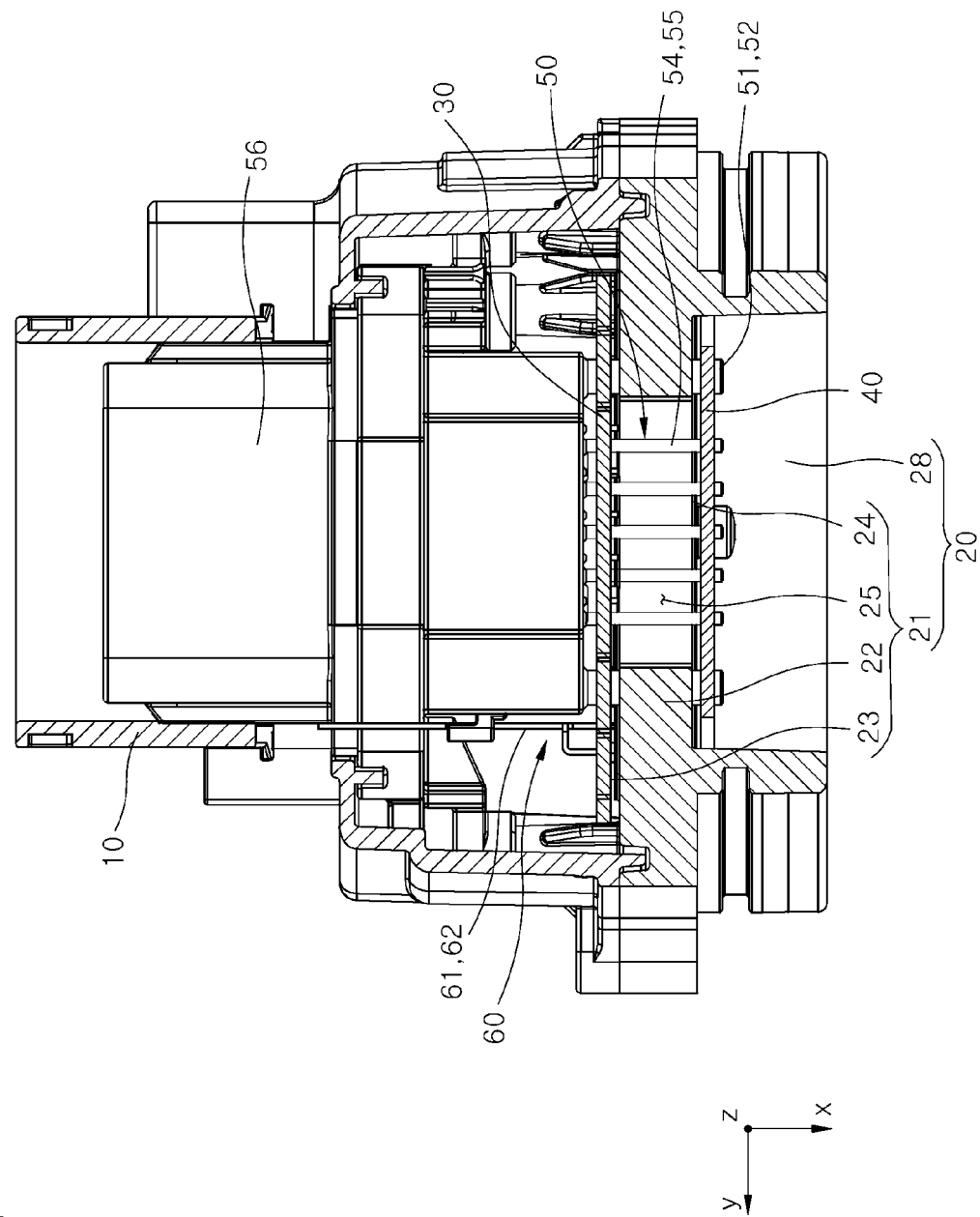
FIG. 3 is a cross-sectional view illustrating the main parts of the ECU for redundancy of the MDPS for a vehicle in accordance with an embodiment of the present disclosure, when seen in a different direction from FIG. 2.

FIG. 1 is an assembled view illustrating main parts of an ECU for redundancy of an MDPS for a vehicle in accordance with an embodiment of the present disclosure, FIG. 2 is a cross-sectional view illustrating the main parts of the ECU for redundancy of an MDPS for a vehicle in accordance with the embodiment of the present disclosure, and FIG. 3 is a cross-sectional view illustrating the main parts of the ECU for redundancy of the MDPS for a vehicle in accordance with an embodiment of the present disclosure, when seen in a different direction from FIG. 2.

Referring to FIGS. 1 to 3, an ECU 1 for redundancy of an MDPS for a vehicle in accordance with an embodiment of the present disclosure includes a housing 10, a motor coupling unit 20, a first motor control circuit unit 30, a second motor control circuit unit 40, a power connector 50, a torque sensor connector 60 and a redundancy control unit 70.

The housing 10 is coupled to one side of the motor coupling unit 20, and covers the first motor control circuit unit 30, the second motor control circuit unit 40, the power connector 50, the torque sensor connector 60 and the like, which are mounted on the motor coupling unit 20. In the following descriptions of the present disclosure, 'the inside of the housing 10' indicates a space formed between the housing 10 and the motor coupling unit 20.

Furthermore, the term 'vehicle side' written with a component in the descriptions of the present disclosure indicates that the component is disposed outside the housing 10. In the descriptions of the present disclosure, a component written with the term 'vehicle-side' is distinguished from the components of the ECU 1 for redundancy for an MDPS for a vehicle in accordance with the embodiment of the present disclosure.

The housing 10 has through-holes 11 formed at positions corresponding to the power connector 50 and the torque sensor connector 60, respectively. The power connector 50 and the torque sensor connector 60, located inside the housing 10, may be connected to a vehicle-side power connector 2, a vehicle-side CAN (Controller Area Network) connector 3 and a vehicle-side torque sensor connector 4, which are located outside of the housing 10, through the through-holes 11.

Hereafter, the positions and directions of the components of the ECU 1 for redundancy for an MDPS for a vehicle in accordance with the embodiment of the present disclosure will be described on the basis of an x-direction, a y-direction and a z-direction, which are illustrated in FIGS. 1 to 3, for convenience of description. The x-direction, the y-direction and the z-direction each include a positive (+) direction and a negative (−) direction, and the positive (+) direction and the negative (−) direction are separately marked only in case of necessity.

The motor coupling unit 20 is a device part coupled to a motor 5, has a flat cylindrical shape corresponding to an opening (with no reference numeral) of a motor housing 6 as a whole, and is coupled to the motor housing 6. The motor coupling unit 20 is made of a metallic material capable of implementing a heat radiation function, and serves to receive heat radiated from the first and second motor control circuit units 30 and 40 and discharge the received heat to the outside of the housing 10.

Each of the first and second motor control circuit units 30 and 40 has a circuit structure capable of independently controlling the operation of the motor 5, and is installed on the motor coupling unit 20. The first and second motor control circuit units 30 and 40 are disposed in parallel to each other with a preset interval provided therebetween in the x-direction.

The first motor control circuit unit 30 has a circuit structure which can reliably control the operation of the motor 5 by itself, without connection to the second motor control circuit unit 40 or even though the second motor control circuit unit 40 completely loses its function. The second motor control circuit unit 40 also has a circuit structure which can reliably control the operation of the motor 5 by itself, without connection to the first motor control circuit unit 30 or even though the first motor control circuit unit 30 completely loses its function.

That is, the first and second motor control circuit units 30 and 40 each do not indicate parts of a circuit required for controlling the operation of the motor 5, for example, a power supply unit, a motor control unit and a signal transfer unit, but indicate a circuit capable of fully controlling the operation of the motor 5 by itself, without connection to another motor control circuit unit. The first motor control circuit unit 30 in accordance with the embodiment of the present disclosure is configured as one circuit board. If necessary, however, the first motor control circuit unit 30 may have a structure divided into a plurality of circuit boards. The second motor control circuit unit 40 is also configured as one circuit board, but may have a structure divided into a plurality of circuit boards.

The power connector 50 has one side connected to the vehicle-side power connector 2 and the other side connected to the first and second motor control circuit units 30 and 40 disposed in parallel to each other in the x-direction. When the vehicle-side power connector 2 and the vehicle-side CAN connector 3 are configured as one part, the power connector 50 has a structure which can be connected to each of the vehicle-side power connector 2 and the vehicle-side CAN connector 3.

The torque sensor connector 60 has one side connected to the vehicle-side torque sensor connector 4 and the other side connected to the first and second motor control circuit units 30 and 40 disposed in parallel to each other in the x-direction. The vehicle-side torque sensor connector 4 is connected to a torque sensor (not illustrated) which is installed to sense a steering torque or steering angle of a steering wheel. The torque sensor connector 60 may be provided to control the operation of the motor 5 in connection with the torque sensor.

The redundancy control unit 70 is a device part for implementing redundancy for controlling the operation of the motor 5, and allows the second motor control circuit unit 40 to control the operation of the motor 5, when an abnormality occurs in the first motor control circuit unit 30. Hereafter, between the first and second motor control circuit units 30 and 40, a motor control circuit unit which is substantially controlling the operation of the motor 5 will be referred to as 'an enabled circuit unit', for convenience of description.

When an abnormality of the first motor control circuit unit 30 is sensed while the first motor control circuit unit 30 is set and operated as the enabled circuit unit, the redundancy control unit 70 stops the operation of the motor 5, which has been controlled by the first motor control circuit unit 30, and simultaneously allows the second motor control circuit unit 40 to control the operation of the motor 5 in place of the first motor control circuit unit 30. In other words, the redundancy control unit 70 switches the enabled circuit unit to the second motor control circuit unit 40.

Referring to FIGS. 2 to 3, the motor coupling unit 20 in accordance with the embodiment of the present disclosure includes a board support part 21 and a heat radiation support part 28.

The board support part 21 covers the opening of the motor housing 6, and simultaneously supports the first and second motor control circuit units 30 and 40 at preset positions. The first and second motor control circuit units 30 and 40 are installed on the board support part 21 with a preset interval provided therebetween in the x-direction. The board support part 21 in accordance with the embodiment of the present disclosure includes a support body part 22, a first board support part 23, a second board support part 24 and a terminal through-hole 25.

The support body part 22 is a part forming the basic frame of the board support part 21, and has a disk shape with widths in the y- and z-directions as a whole. This structure considers that the motor housing 6 has a circular opening, but the shape of the support body part 22 is not specifically limited. The shape of the support body part 22 may be changed in various manners depending on the shapes and structures of the motor housing 6 and the first and second motor control circuit units 30 and 40.

The first board support part 23 is formed on one side of the support body part 22 in the x-direction, which faces the housing 10, such that the first motor control circuit unit 30 abuts on the first board support part 23. The second board support part 24 is formed on the other surface of the support body part 22 in the x-direction, which faces the motor 5, such that the second motor control circuit unit 40 abuts on the second board support part 24.

With the first and second motor control circuit units 30 and 40 installed on the first and second board support parts 23 and 24, respectively, the first and second motor control circuit units 30 and 40 are disposed in parallel to each other in the x-direction with an interval provided therebetween, the interval corresponding to the x-direction thickness of the support body part 22. The edge of the one surface of the support body part 22 in the x-direction, which faces the housing 10, is coupled to the housing 10.

As the first and second motor control circuit units 30 and 40 abut on both surfaces of the support body part 22 in the x-direction, heats generated from the first and second motor control circuit units 30 and 40 are directly transferred to the support body part 22. Thus, an excellent heat radiation effect may be stably implemented for both of the first and second motor control circuit units 30 and 40.

The terminal through-hole 25 serves to provide a passage where the power connector 50 and the torque sensor connector 60 can be extended through the support body part 22 in the x-direction. The terminal through-hole 25 is formed at a position of the support body part 22, which corresponds to the power connector 50 and the torque sensor connector 60, so as to pass through the support body part 22 in the x-direction.

A power terminal part 51 and a CAN terminal part 54, which are included in the power connector 50, and a torque sensor terminal part 61 included in the torque sensor connector 60 may be connected to both of the first and second motor control circuit units 30 and 40 disposed on both surfaces of the support body part 22 in the x-direction, while extended through the support body part 22 in the x-direction via the terminal through-hole 25. The power terminal part 51, the CAN terminal part 54 and the torque sensor terminal part 61 will be described below.

The heat radiation support part 28 protrudes from the edge of the other surface of the board support part 21 in the x-direction, which faces the motor 5, and is coupled to the motor housing 6. The motor coupling unit 20 is made of a metallic material capable of implementing a heat transfer function and a heat radiation function, and serves to receive heat radiated from the first and second motor control circuit units 30 and 40 through the board support part 21, and discharge the received heat to the outside of the housing 10 and the motor housing 6 through the heat radiation support part 28.

Figure 4:
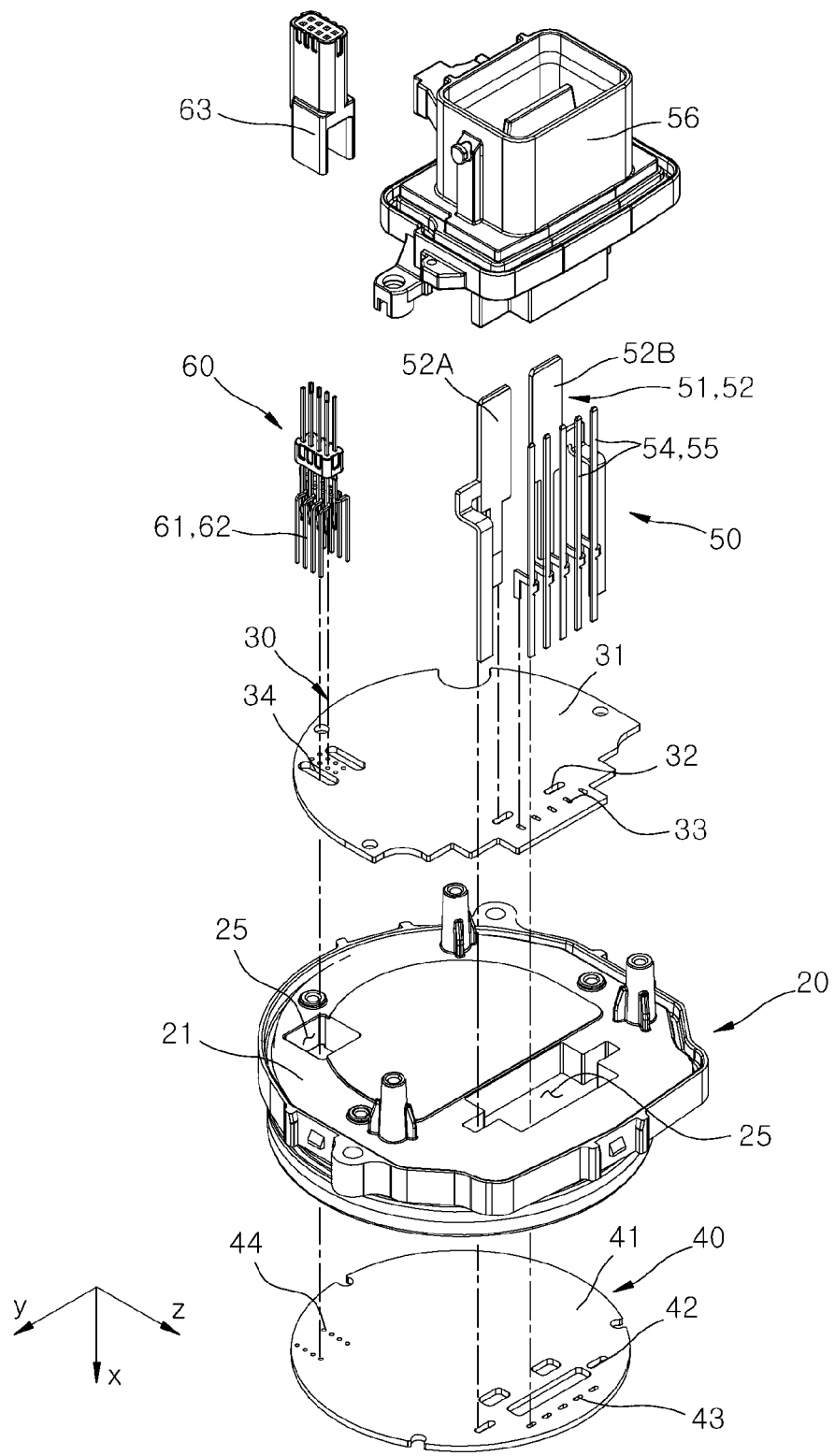
FIG. 4 is an exploded perspective view illustrating the main parts of the ECU for redundancy of an MDPS for a vehicle in accordance with the embodiment of the present disclosure.
Figure 5:
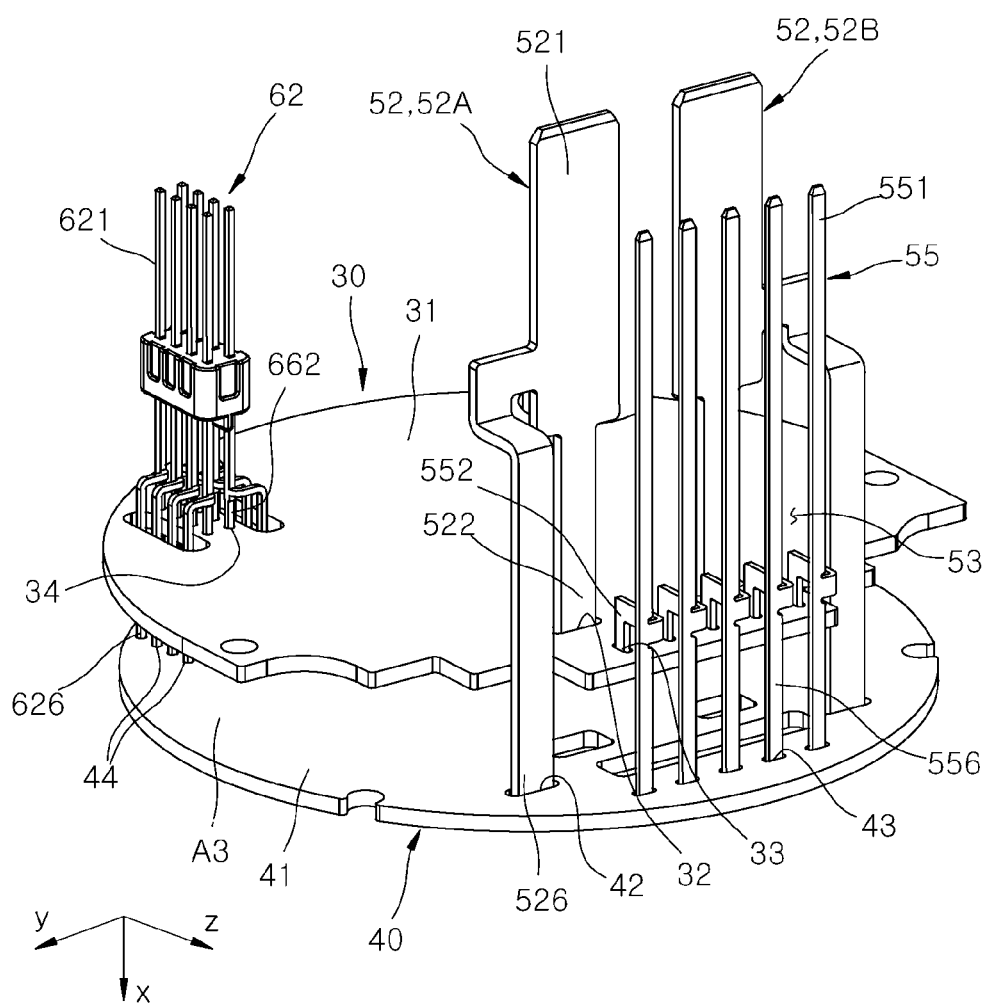
FIG. 5 is a perspective view illustrating the main parts of the ECU for redundancy of an MDPS for a vehicle in accordance with the embodiment of the present disclosure.
Figure 6:
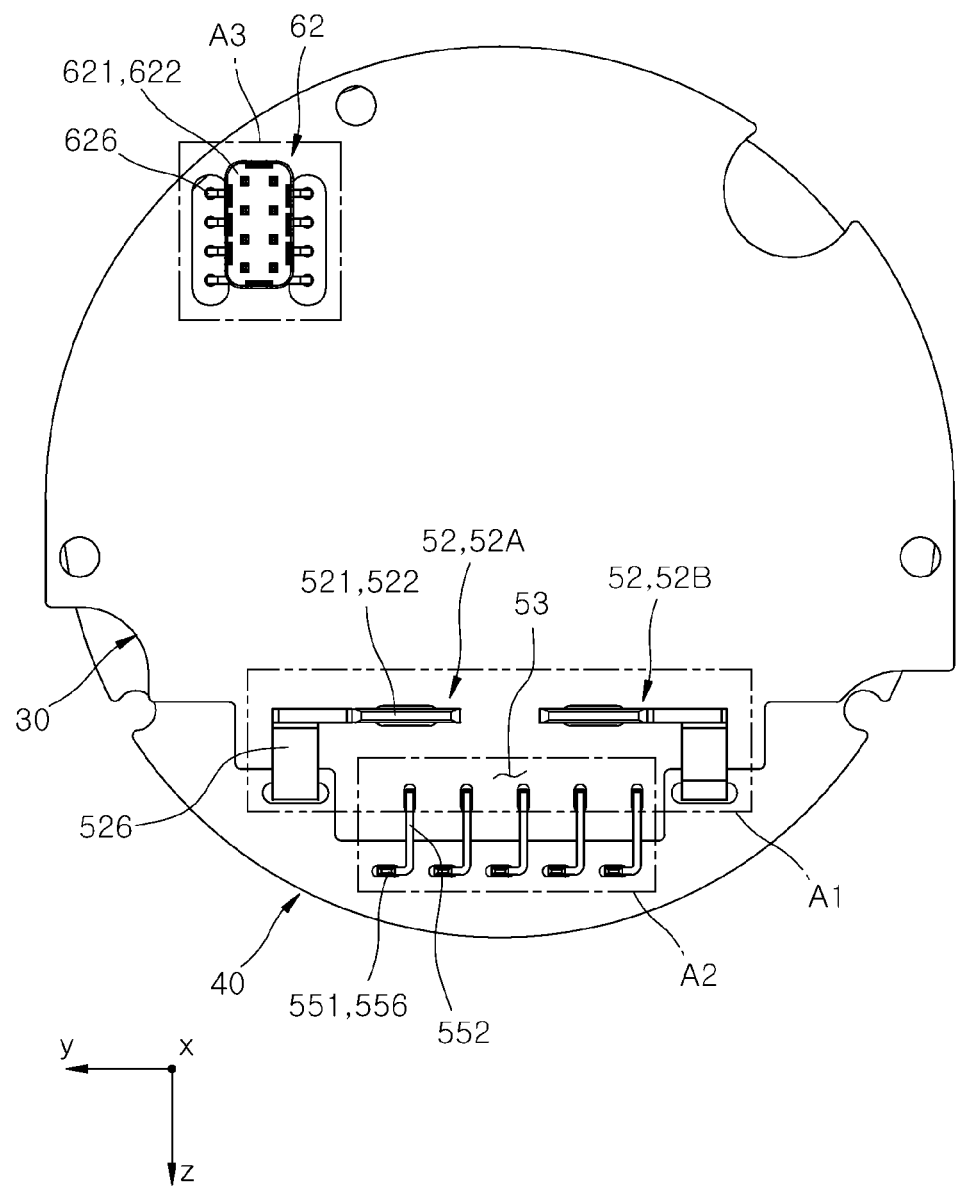
FIG. 6 is a plan view of FIG. 5.

FIG. 4 is an exploded perspective view illustrating the main parts of the ECU for redundancy of an MDPS for a vehicle in accordance with the embodiment of the present disclosure, FIG. 5 is a perspective view illustrating the main parts of the ECU for redundancy of an MDPS for a vehicle in accordance with the embodiment of the present disclosure, and FIG. 6 is a plan view of FIG. 5.

Referring to FIGS. 4 to 6, the first motor control circuit unit 30 in accordance with the embodiment of the present disclosure includes a first circuit board 31, a first power terminal connection part 32, a first communication terminal connection part 33 and a first sensor terminal connection part 34.

The first circuit board 31 has a circuit structure which can independently control the operation of the motor 5. The first circuit board 31 is connected to the power terminal part 51 disposed in a first area A1 and connected to the vehicle-side power connector 2, and receives power. The first communication terminal connection part 33 is connected to the CAN terminal part 54 disposed in a second area A2 of the first circuit board 31 and connected to the vehicle-side CAN connector 3, and receives a signal.

The first sensor terminal connection part 34 is connected to the torque sensor terminal part 61 disposed in a third area A3 of the first circuit board 31 and connected to the vehicle-side torque sensor connector 4, and receives a signal. In the descriptions of the present disclosure, it is assumed that the first area A1, the second area A2 and the third area A3 each have the cross-sectional shape of a figure with no concave portion, such as a rectangle, triangle or circle, the figure being completed by extending a line in one direction corresponding to the clockwise direction or the counterclockwise direction.

Referring to FIGS. 4 and 5, the second motor control circuit unit 40 in accordance with the embodiment of the present disclosure includes a second circuit board 41, a second power terminal connection part 42, a second communication terminal connection part 43 and a second sensor terminal connection part 44.

The second circuit board 41 has a circuit structure for independently controlling the operation of the motor 5. The second power terminal connection part 42 is disposed on an x-direction extension line of the first area A1 of the second circuit board 41, and connected to the power terminal part 51 so as to receive power. The second communication terminal connection part 43 is disposed on an x-direction extension line of the second area A2 of the second circuit board 41, and connected to the CAN terminal part 54 so as to receive a signal.

The second sensor terminal connection part 44 is disposed on an x-direction extension line of the third area A3 of the second circuit board 41, and connected to the torque sensor terminal part 61 so as to receive a signal. Hereafter, for convenience of description, the first area A1 and an area belonging to the x-direction extension line of the first area A1 are not separately distinguished from each other, but collectively referred to as the first area A1. For example, the first area A1 on the second circuit board 41 indicates an area belonging to the x-direction extension line of the first area A1.

Figure 7:
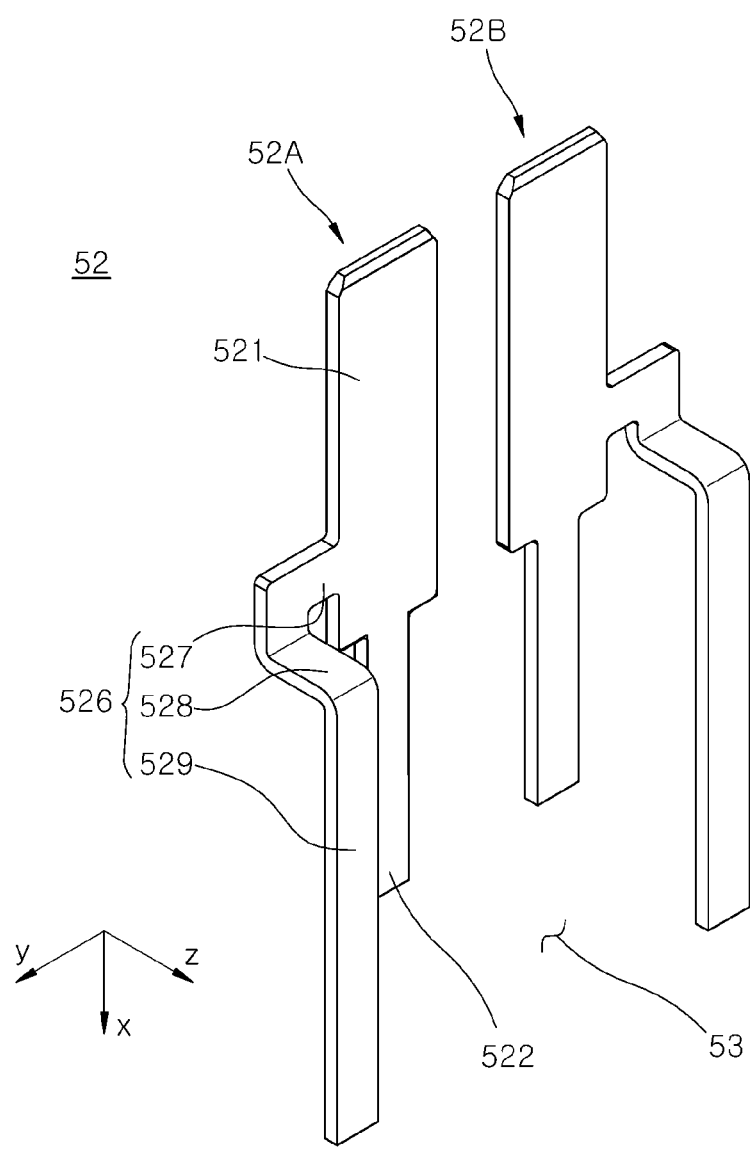
FIG. 7 is a perspective view schematically illustrating a double-layer power terminal part in accordance with the embodiment of the present disclosure.

FIG. 7 is a perspective view schematically illustrating a double-layer power terminal part in accordance with the embodiment of the present disclosure.

Referring to FIG. 4, the power connector 50 in accordance with the embodiment of the present disclosure includes the power terminal part 51, the CAN terminal part 54 and a first insert molding part 56.

The power terminal part 51 has a bus bar structure extended in the x-direction, and is connected to the vehicle-side power connector 2, the first motor control circuit unit 30 and the second motor control circuit unit 40. One side of the power terminal part 51 in the x-direction is connected to the vehicle-side power connector 2, and the other side of the power terminal part 51 in the x-direction is connected to the first and second motor control circuit units 30 and 40.

In particular, when the other side of the power terminal part 51 in the x-direction is extended in the x-direction, the other side of the power terminal part 51 diverges into a plurality of portions which are connected to the first power terminal connection part 32 of the first motor control circuit unit 30 at a first layer and the second power terminal connection part 42 of the second motor control circuit unit 40 at a second layer. In the descriptions of the present disclosure, such a part having an end portion diverging into double layers is referred to as a double-layer power terminal part 52.

That is, the power terminal part 51 in accordance with the present disclosure includes the double-layer power terminal part 52 having a bus bar structure that extends in the x-direction while diverging into a plurality of portions which can be simultaneously connected to the first and second motor control circuit units 30 and 40 disposed in parallel to each other in the x-direction. Referring to FIGS. 5 and 7, the double-layer power terminal part 52 in accordance with the embodiment of the present disclosure includes a first bus bar 52A, a second bus bar 52B, and an intersection space 53.

The first and second bus bars 52A and 52B are terminals connected to negative and positive terminals of the vehicle-side power connector 2, respectively, and are disposed symmetrically with each other in the y-direction. Between the first and second bus bars 52A and 52B, the intersection space 53 is formed, in which at least a part of the CAN terminal part 54 can be disposed.

When at least a part of a double-layer CAN terminal part 55 is disposed in the intersection space 53, the intersection space 53 is shared by the first area A1 in which the first and second power terminal connection parts 32 and 42 are disposed and the second area A2 in which the first and second communication terminal connection parts 33 and 43 are disposed. In other words, at least a part of the first area A1 in which the double-layer power terminal part 52 is disposed and at least a part of the second area A2 in which the double-layer CAN terminal part 55 is disposed cross or overlap each other.

In accordance with the embodiment of the present disclosure, the first and second areas A1 and A2 are not disposed independently of each other, but share an area corresponding to the intersection space 53. Thus, the double-layer power terminal part 52 and the double-layer CAN terminal part 55, each of which has a plurality of diverging portions and is formed in a 3D shape, may be efficiently disposed in a limited space. Referring to FIGS. 5 and 7, the double-layer power terminal part 52 in accordance with the embodiment of the present disclosure includes an external power connection part 521, a first-layer power connection part 522 and a second-layer power connection part 526.

The external power connection part 521 is a terminal connected to the vehicle-side power connector 2, and the first-layer power connection part 522 and the second-layer power connection part 526 are terminals connected to the first power terminal connection part 32 and the second power terminal connection part 42, respectively. The external power connection part 521 has a first width in the y-direction and extends in the x-direction, and the first and second power terminal connection parts 32 and 42 both have a second width smaller than the first width, and diverge from the external power connection part 521 and extend in the x-direction.

As the external power connection part 521 has the first width, it is possible to clearly and stably secure a contact area with the vehicle-side power connector 2. As the first and second power terminal connection parts 32 and 42 have the second width smaller than the first width, the first and second power terminal connection parts 32 and 42 may be stably connected to the first-layer power connection part 522 and the second-layer power connection part 526, respectively, without interference with other circuit parts constituting the first and second motor control circuit units 30 and 40.

The first-layer power connection part 522 diverges so as to protrude in the +x-direction from a +x-direction end portion of the external power connection part 521, and connects to the first power terminal connection part 32. The second-layer power connection part 526 diverges so as to protrude in the +x-direction from the external power connection part 521, and extends in the +x-direction from a position spaced apart in the x-direction from the first-layer power connection part 522.

More specifically, the second-layer power connection part 526 diverges so as to protrude in the y-direction from an x-direction middle portion of the external power connection part 521, passes through the terminal through-hole 25 of the motor coupling unit 20 in the +x-direction, and then connects to the second power terminal connection part 42. Referring to FIG. 7, the second-layer power connection part 526 of the first bus bar 52A in accordance with the embodiment of the present disclosure includes a power diverging part 527, a power middle extension part 528 and a power extension end part 529.

The power diverging part 527 protrudes in the +y-direction from a position corresponding to the x-direction middle portion and a +y-direction end portion of the external power connection part 521. The power middle extension part 528 is extended in the +z-direction from a +x-direction end portion of the power diverging part 527. The power extension end part 529 is extended in the +x-direction from a +z-direction end portion of the power middle extension part 528.

The +x-direction end portion of the power extension end part 529 is spaced apart in the x-, y- and z-directions from the +x-direction end portion of the first-layer power connection part 522. That is, the +x-direction end portions of the first-layer power connection part 522 and the power extension end part 529 are clearly spaced apart from each other in all directions corresponding to the x-, y- and z-directions.

Therefore, it is possible to lower the possibility that the first-layer power connection part 522 and the second-layer power connection part 526 will be misassembled or interfere with each other during an assembling or manufacturing process, due to an error or mistake, thereby further improving the productivity. Furthermore, it is possible to minimize the possibility that the damage to one power connection part will have an influence on the other power connection part, thereby securing structural stability.

The double-layer power terminal part 52 having the above-described structure may be easily manufactured as one body through a simple process of cutting a metallic material into a structure including the external power connection part 521, the first-layer power connection part 522 and the second-layer power connection part 526, and then bending portions corresponding to the power middle extension part 528 and the power extension end part 529 in a multi-stage manner in the +z-direction and the +x-direction, respectively.

The second bus bar 52B is located in the −y-direction of the first bus bar 52A, and the second-layer power connection part 526 of the second bus bar 52B has a symmetrical shape with the second-layer power connection part 526 of the first bus bar 52A in the y-direction. The intersection space 53 in accordance with the embodiment of the present disclosure is formed between the second-layer power connection part 526 of the first bus bar 52A and the second-layer power connection part 526 of the second bus bar 52B.

Figure 8:
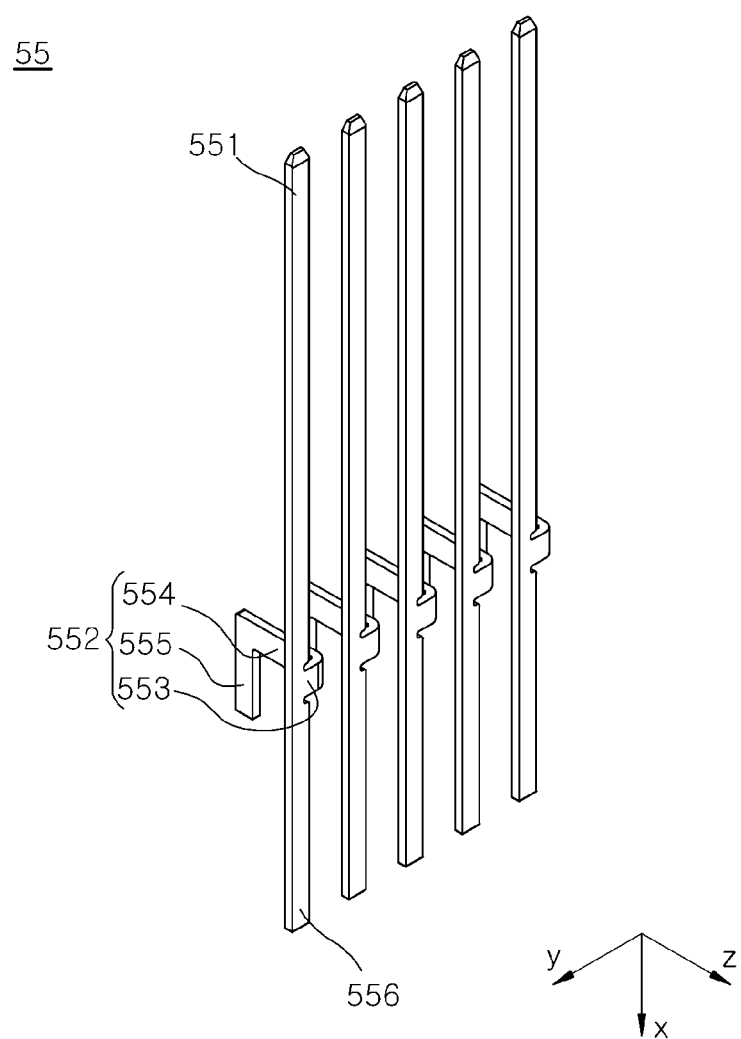
FIG. 8 is a perspective view schematically illustrating a double-layer CAN (Controller Area Network) terminal part in accordance with the embodiment of the present disclosure.

FIG. 8 is a perspective view schematically illustrating a double-layer CAN terminal part in accordance with an embodiment of the present disclosure.

Referring to FIGS. 5 and 8, the CAN terminal part 54 has a bus bar structure extended in the x-direction, and is connected to the vehicle-side CAN connector 3, the first motor control circuit unit 30 and the second motor control circuit unit 40. One side of the CAN terminal part 54 in the x-direction is connected to the vehicle-side power connector 2, and the other side of the CAN terminal part 54 in the x-direction is connected to the first and second motor control circuit units 30 and 40.

In particular, when the other side of the CAN terminal part 54 in the x-direction is extended in the x-direction, the other side of the CAN terminal part 54 diverges into a plurality of portions which are connected to the first communication terminal connection part 33 of the first motor control circuit unit 30 at the first layer and the second communication terminal connection part 43 of the second motor control circuit unit 40 at the second layer. In the descriptions of the present disclosure, such a part having an end portion diverging into double layers is referred to as the double-layer CAN terminal part 55.

That is, the CAN terminal part 54 in accordance with the present disclosure includes the double-layer CAN terminal part 55 having a bus bar structure that is extended in the x-direction while diverging into a plurality of portions which can be simultaneously connected to the first and second motor control circuit units 30 and 40 disposed in parallel to each other in the x-direction. Furthermore, the CAN terminal part 54 has a structure in which a plurality of double-layer CAN terminal parts 55 are aligned in one direction. In the embodiment of the present disclosure, the plurality of double-layer CAN terminal parts 55 are aligned in the y-direction. The double-layer CAN terminal part 55 in accordance with the embodiment of the present disclosure includes an external CAN connection part 551, a first-layer CAN connection part 552 and a second-layer CAN connection part 556.

The external CAN connection part 551 is a terminal connected to the vehicle-side CAN connector 3, and the first-layer CAN connection part 552 and the second-layer CAN connection part 556 are terminals connected to the first communication terminal connection part 33 and the second communication terminal connection part 43, respectively.

The external CAN connection part 551 is disposed in the +z-direction of the double-layer power terminal part 52, and extended in the x-direction. The first-layer CAN connection part 552 and the second-layer CAN connection part 556 diverge from the external CAN connection part 551, and extend in the x-direction.

The first-layer CAN connection part 552 diverges so as to protrude in the −y-direction from a −y-direction end portion of the external CAN connection part 551, extends in the −z-direction, and then extends in the +x-direction. An end portion of the first-layer CAN connection part 552, extending in the +x-direction, passes through the terminal through-hole 25 of the motor coupling unit 20 in the +x-direction, and then connects to the first communication terminal connection part 33.

The second-layer CAN connection part 556 diverges in a shape to further extend in the +x-direction from a +x-direction end portion of the external CAN connection part 551, and connects to the second communication terminal connection part 43. Referring to FIG. 8, the first-layer CAN connection part 552 includes a CAN diverging part 553, a CAN middle extension part 554, and a CAN extension end part 555.

The CAN diverging part 553 protrudes in the −y-direction from a position corresponding to a +x-direction middle portion and the −y-direction end portion of the external CAN connection part 551. The CAN middle extension part 554 extends in the −z-direction from the CAN diverging part 553. The CAN extension end part 555 extends in the +x-direction from a −z-direction end portion of the CAN middle extension part 554.

The +x-direction end portion of the CAN extension end part 555 is spaced apart in the x-, y- and z-directions from the +x-direction end portion of the second-layer CAN connection part 556. That is, the +x-direction end portions of the first-layer CAN connection part 552 and the second-layer CAN connection part 556 are clearly spaced apart from each other in all directions corresponding to the x-, y- and z-directions.

Therefore, it is possible to lower the possibility that the first-layer CAN connection part 552 and the second-layer CAN connection part 556 will be misassembled or interfere with each other during an assembling or manufacturing process, due to an error or mistake, thereby further improving the productivity. Furthermore, it is possible to minimize the possibility that the damage to one CAN connection part will have an influence on the other CAN connection part, thereby securing structural stability.

The double-layer CAN terminal part 55 having the above-described structure may be easily manufactured as one body through a simple process of cutting a metallic material into a structure including the external CAN connection part 551, the first-layer CAN connection part 552 and the second-layer CAN connection part 556, and then bending a portion corresponding to the CAN middle extension part 554 in the −z-direction.

The double-layer CAN terminal part 55 in accordance with the embodiment of the present disclosure has a structure in which a plurality of double-layer CAN terminal parts 55 are arranged in the y-direction. The external CAN connection part 551 and the second-layer CAN connection part 556 of the double-layer CAN terminal part 55 are located outside the first area A1 in the +z-direction, and the first-layer CAN connection part 552 of the double-layer CAN terminal 55 is located so as to overlap the inside of the first area A1 or located in the intersection space 53.

The first insert molding part 56 is made of an insulating material, and the plurality of double-layer power terminal parts 52, each including the first and second bus bars 52A and 52B arranged symmetrically in the y-direction, and the plurality of double-layer CAN terminal parts 55 arranged in the y-direction, are connected as one body by the first insert molding part 56 through insert molding.

The double-layer power terminal part 52 and the double-layer CAN terminal part 55 become one part corresponding to the power connector 50 by the first insert molding part 56. As the first insert molding part 56 is fixedly installed at a preset position of the motor coupling unit 20, the double-layer power terminal part 52 and the double-layer CAN terminal part 55, which are connected to the first insert molding part 56, are disposed at intended positions on the first and second motor control circuit units 30 and 40, as described above.

Figure 9:
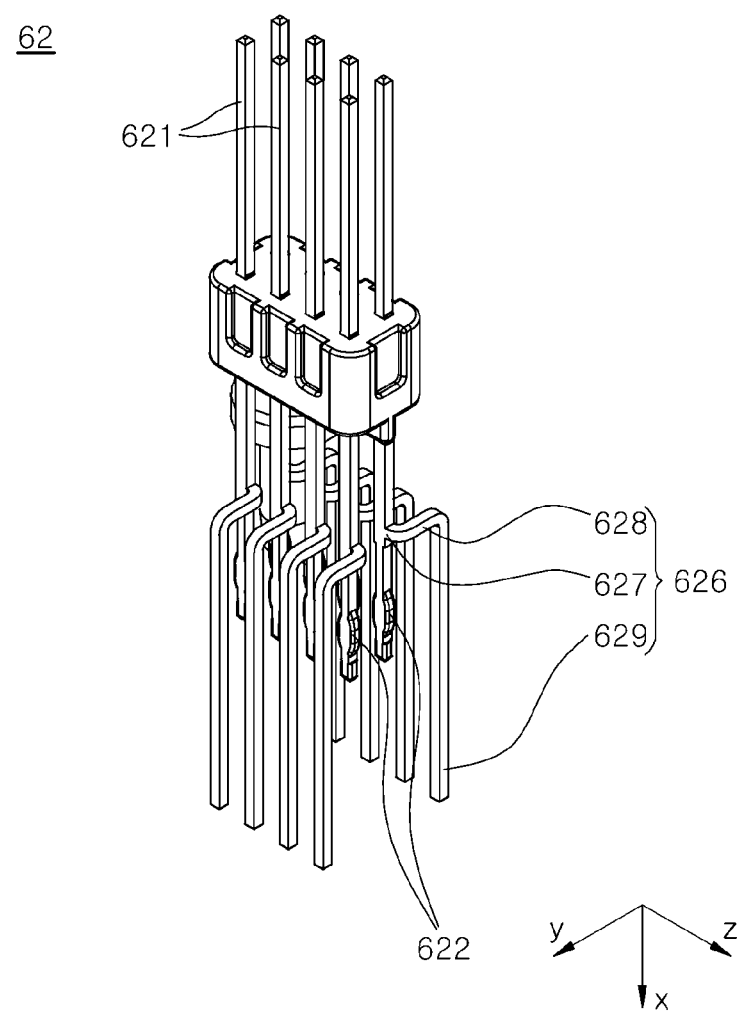
FIG. 9 is a perspective view schematically illustrating a double-layer sensor terminal part in accordance with the embodiment of the present disclosure.

FIG. 9 is a perspective view schematically illustrating a double-layer sensor terminal part in accordance with an embodiment of the present disclosure.

Referring to FIG. 4, the torque sensor connector 60 in accordance with the embodiment of the present disclosure includes the torque sensor terminal part 61 and a second insert molding part 63.

The torque sensor terminal part 61 has a structure extended in the x-direction, and is connected to the vehicle-side torque sensor connector 4, the first motor control circuit unit 30 and the second motor control circuit unit 40. One side of the torque sensor terminal part 61 in the x-direction is connected to the vehicle-side torque sensor connector 4, and the other side of the torque sensor terminal part 61 in the x-direction is connected to the first and second motor control circuit units 30 and 40.

In particular, when the other side of the torque sensor terminal part 61 in the x-direction is extended in the x-direction, the other side of the torque sensor terminal part 61 diverges into a plurality of portions which are connected to the first sensor terminal connection part 34 of the first motor control circuit unit 30 at the first layer and the second sensor terminal connection part 44 of the second motor control circuit unit 40 at the second layer. In the descriptions of the present disclosure, such a part having an end portion diverging into double layers is referred to as a double-layer sensor terminal part 62.

That is, the torque sensor terminal part 61 in accordance with the present disclosure includes the double-layer sensor terminal part 62 having a bus bar structure that is extended in the x-direction while diverging into a plurality of portions which can be simultaneously connected to the first and second motor control circuit units 30 and 40 disposed in parallel to each other in the x-direction. Furthermore, the torque sensor terminal part 61 has a structure in which a plurality of double-layer sensor terminal parts 62 are aligned in the y-direction and the z-direction. The double-layer sensor terminal part 62 in accordance with the embodiment of the present disclosure includes an external sensor connection part 621, a first-layer sensor connection part 622, and a second-layer sensor connection part 626.

The external sensor connection part 621 is a terminal connected to the vehicle-side torque sensor connector 4, and the first-layer sensor connection part 622 and the second-layer sensor connection part 626 are terminals connected to the first sensor terminal connection part 34 and the second sensor terminal connection part 44, respectively. The external sensor connection part 621 is extended in the x-direction, and the first and second-layer sensor connection parts 622 and 626 diverge from the external sensor connection part 621 and extend in the x-direction.

The first-layer sensor connection part 622 diverges so as to protrude in the +x-direction from a +x-direction end portion of the external sensor connection part 621, and connects to the first sensor terminal connection part 34. The second-layer sensor connection part 626 diverges so as to protrude in the +z-direction from a +z-direction end of the external sensor connection part 621, extends in the y-direction, and then extends in the +x-direction.

More specifically, the second-layer sensor connection part 626 diverges so as to protrude in the z-direction and the y-direction from an x-direction middle portion of the external sensor connection part 621, passes through the terminal through-hole 25 of the motor coupling unit 20 in the +x-direction, and then connects to the second sensor terminal connection part 44.

Referring to FIG. 9, the second-layer sensor connection part 626 in accordance with the embodiment of the present disclosure includes a sensor diverging part 627, a sensor middle extension part 628, and a sensor extension end part 629.

The sensor diverging part 627 protrudes in the +z-direction from a position corresponding to an x-direction middle portion and the +z-direction end portion of the external sensor connection part 621. The sensor diverging part 627 protrudes in the z-direction from the other side. The sensor middle extension part 628 is extended in the y-direction from a +z-direction end portion of the sensor diverging part 627. The sensor extension end part 629 is extended in the +x-direction from a +y-direction end portion of the sensor middle extension part 628.

The +x-direction end portion of the sensor extension end part 629 is spaced apart in the x-, y- and z-directions from the +x-direction end of the first-layer sensor connection part 622. That is, the +x-direction end portions of the first-layer sensor connection part 622 and the second-layer sensor connection part 626 are clearly spaced apart from each other in all directions corresponding to the x-, y- and z-directions.

Therefore, it is possible to lower the possibility that the first-layer sensor connection part 622 and the second-layer sensor connection part 626 will be misassembled or interfere with each other during an assembling or manufacturing process, due to an error or mistake, thereby further improving the productivity. Furthermore, it is possible to minimize the possibility that the damage to one sensor connection part will have an influence on the other sensor connection part, thereby securing structural stability.

The double-layer sensor terminal part 62 having the above-described structure may be easily manufactured as one body through a simple process of cutting a metallic material into a structure including the external sensor connection part 621, the first-layer sensor connection part 622 and the second-layer sensor connection part 626, and then bending a portion corresponding to the sensor middle extension part 628 in a multi-stage manner in the +y-direction.

The second insert molding part 63 is made of an insulating material, and the plurality of double-layer sensor terminal parts 62 arranged in the y-direction and the z-direction are connected as one body through insert molding. The plurality of double-layer sensor terminal parts 62 become one part corresponding to the torque sensor connector 60 by the second insert molding part 63.

The second insert molding part 63 is extended from the external sensor connection part 621 to the second-layer sensor connection part 626, and fitted and installed into the terminal through-hole 25 of the motor coupling unit 20 in the x-direction. As the second insert molding part 63 is fixedly installed at a preset position of the motor coupling unit 20, the plurality of double-layer sensor terminal parts 62 connected to the second insert molding part 63 are disposed at intended positions on the first and second motor control circuit units 30 and 40, as described above.

Like the double-layer power terminal part 52 and the double-layer CAN terminal part 55, the double-layer sensor terminal part 62 has an x-direction length enough to pass through the first and second circuit boards 31 and 41, and has a smaller thickness or narrower cross-sectional area than the double-layer power terminal part 52 and the double-layer CAN terminal part 55. The extension shape and arrangement of the double-layer sensor terminal part 62 may be reliably maintained by the second insert molding part 63.

Referring to FIG. 2, the redundancy control unit 70 in accordance the embodiment of the present disclosure includes a circuit detection part 71, an abnormality determination part 74, and a driving circuit switching part 75.

The circuit detection part 71 serves to detect the operation states of the first motor control circuit unit 30. The circuit detection part 71 in accordance with the embodiment of the present disclosure includes a first circuit detector 72 and a second circuit detector 73. The first circuit detector 72 serves to detect the operation state of the first motor control circuit unit 30. The second circuit detector 73 serves to detect the operation state of the second motor control circuit unit 40.

When an abnormality occurs in the first motor control circuit unit 30 while the first motor control circuit unit 30 is set and operated as the enabled circuit unit, the first circuit detector 72 detects the abnormality. When an abnormality also occurs in the second motor control circuit unit 40 which is not enabled, the second circuit detector 73 detects the abnormality. Such an operation may be performed while power is supplied to both of the first and second motor control circuit units 30 and 40 by the power connector 50 including the double-layer power terminal part 52.

The abnormality determination part 74 determines whether the first motor control circuit unit 30 is abnormal, according to a signal detected by the circuit detection part 71. The abnormality determination part 74 may compare the detection signals of the first and second circuit detectors 72 and 73, and determine that an abnormality occurred in the first or second circuit detector 72 or 73, when a difference between the signal values is equal to or more than a preset range.

Furthermore, the abnormality determination part 74 may previously secure data on a preset value for the detection signal of the first circuit detector 72, for example, a signal value which may occur while the first circuit detector 72 is normally operated, through a plurality of experiments, and compares the data to a preset signal value, in order to determine whether the first circuit detector 72 is abnormal.

When the abnormality determination part 74 determines that an abnormality occurred in the first motor control circuit unit 30 while the motor 5 was controlled by the first motor control circuit unit 30, the driving circuit switching part 75 stops the operation of the motor 5 by the first motor control circuit unit 30, and switches the enabled control circuit unit such that the second motor control circuit unit 40 controls the operation of the motor 5.

That is, when an abnormality occurs in the first motor control circuit unit 30 while the first motor control circuit unit 30 is set and operated as the enabled circuit unit, the driving circuit switching part 75 switches the enabled circuit unit from the first motor control circuit unit 30 to the second motor control circuit unit 40. Thus, although one of the first and second motor control circuit units 30 and 40 fails, the other one may control the operation of the motor 5, such that the MDPS for a vehicle can maintain a normal operation state.

Figure 10:
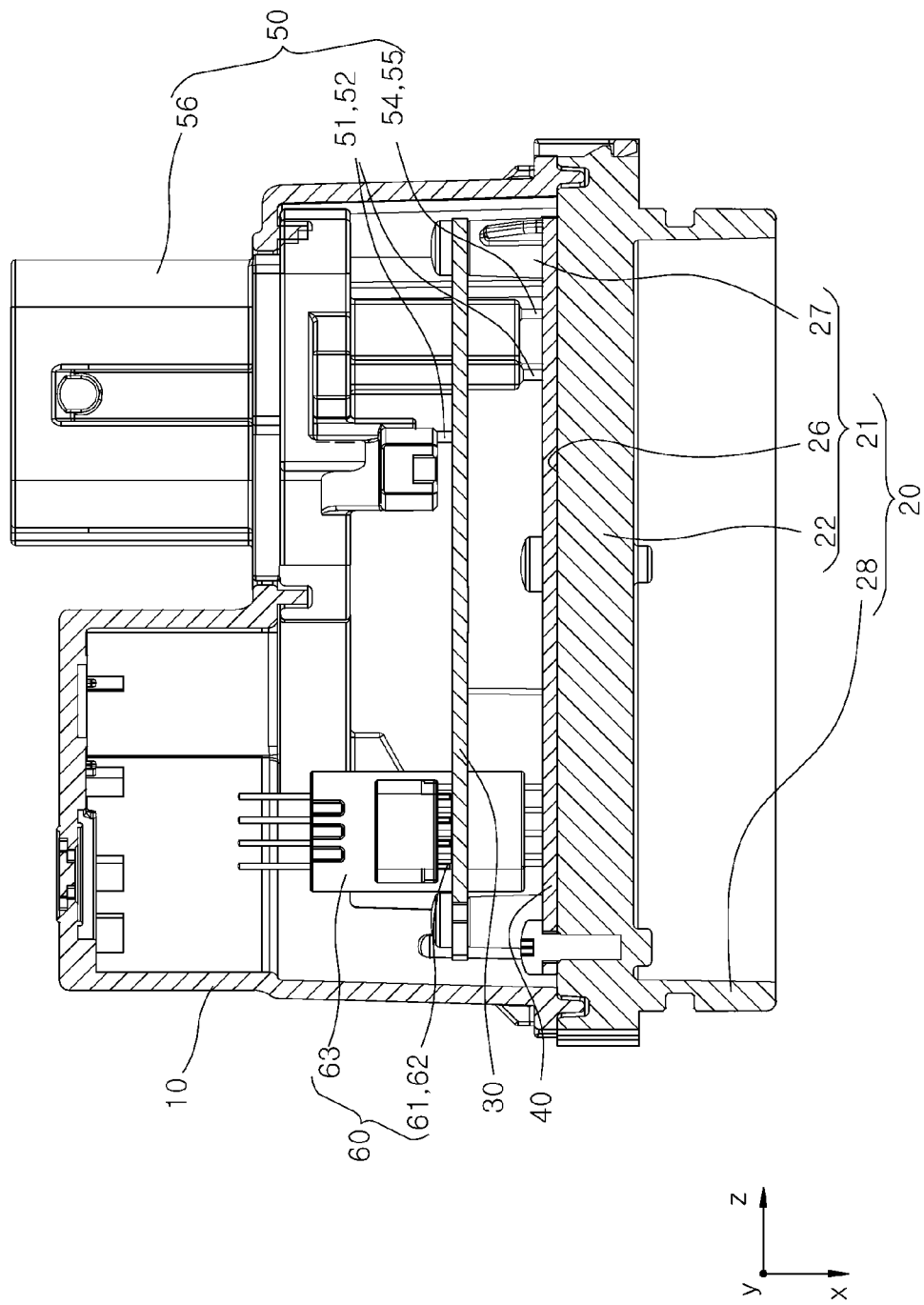
FIG. 10 is a cross-sectional view illustrating main parts of an ECU for redundancy of an MDPS for a vehicle in accordance with another embodiment of the present disclosure.

FIG. 10 is a cross-sectional view illustrating main parts of an ECU for redundancy of an MDPS for a vehicle in accordance with another embodiment of the present disclosure.

An ECU 1 for redundancy of an MDPS for a vehicle in accordance with the another embodiment of the present disclosure, illustrated in FIG. 10, is different from the ECU 1 for redundancy of the MDPS for a vehicle in accordance with the embodiment of the present disclosure, illustrated in FIGS. 1 to 9, in that the first and second motor control circuit units 30 and 40 are not disposed on both sides of the motor coupling unit 20 in the x-direction, but disposed on one side of the motor coupling unit 20 in the x-direction.

Hereafter, while the ECU 1 for redundancy of an MDPS for a vehicle in accordance with the another embodiment of the present disclosure is described, the repeated descriptions of the same, similar or corresponding components as or to those of the ECU 1 for redundancy of an MDPS for a vehicle in accordance with the embodiment of the present disclosure will be omitted, and the following descriptions will be focused on differences therebetween.

The ECU 1 for redundancy of an MDPS for a vehicle in accordance with the another embodiment of the present disclosure has a structure in which the first and second motor control circuit units 30 and 40 are spaced apart from each other with a preset interval provided therebetween in the x-direction, and disposed in parallel to each other only inside the housing 10 or in the space formed between the housing 10 and the motor coupling unit 20.

Referring to FIG. 10, the board support part 21 in accordance with the another embodiment of the present disclosure includes a support body part 22, a contact support part 26, and a spacing support part 27.

The support body part 22 is a part forming the basic frame of the board support part 21, and has a disk shape with widths in the y- and z-directions as a whole. This structure considers that the motor housing 6 has a circular opening, and the shape of the support body part 22 is not specifically limited. The shape of the support body part 22 may be changed to various shapes depending on the shapes and structures of the motor housing 6 and the first and second motor control circuit units 30 and 40.

The contact support part 26 is formed on one surface of the support body part 22, facing the housing 10, i.e. one surface facing the x-direction, such that the second motor control circuit unit 40 abuts on the contact support part 26. The spacing support part 27 protrudes in the −x-direction from the contact support part 26, and supports the first motor control circuit unit 30.

With the first and second motor control circuit units 30 and 40 installed on the contact support part 26 and the spacing support part 27, respectively, the first and second motor control circuit units 30 and 40 are disposed in parallel to each other in the x-direction with an interval provided therebetween, the interval corresponding to the x-direction height of the spacing support part 27. The edge of the contact support part 26 is coupled to the housing 10.

The spacing support part 27 is provided as a plurality of spacing support parts which can distributedly support the edge of the first motor control circuit unit 30 from a plurality of points. Furthermore, the spacing support part 27 is formed in the shape of a tube having a −x-direction end to which a pin or bolt member (not illustrated) may be fastened. As the first motor control circuit unit 30 is seated on the spacing support part 27 and fastened through a pin or bolt member, the first motor control circuit unit 30 may be reliably fixed to a preset position inside the housing 10.

As the second motor control circuit unit 40 is disposed so as to abut on the support body part 22, heat generated from the second motor control circuit unit 40 is directly transferred to the support body part 22. Between the respective spacing support parts 27, a path is formed, through which heat discharged from the first motor control circuit unit 30 can smoothly pass. Thus, an excellent heat radiation effect may be stably implemented for both of the first and second motor control circuit units 30 and 40.

In the ECU 1 for redundancy of an MDPS for a vehicle in accordance with the another embodiment of the present disclosure, which has the above-described configuration, when an abnormality occurs in the first motor control circuit unit 30 while the first motor control circuit unit 30 is set and operated as the enabled circuit unit, the redundancy control unit 70 may switch the enabled circuit unit from the first motor control circuit unit 30 to the second motor control circuit unit 40. Thus, although one of the first and second motor control circuit units 30 and 40 fails, the other may control the operation of the motor 5, thereby maintaining the normal operation state of the MDPS for a vehicle.

Furthermore, in accordance with the present disclosure, the redundancy of the MDPS for a vehicle can be implemented by only changing the internal structure of the ECU 1 such that the ECU 1 includes the double-layer power terminal part 52, the double-layer CAN terminal part 55 and the double-layer sensor terminal part 62. Thus, the MDPS can be widely and easily applied to various vehicle specifications, and the numbers of the vehicle-side power connectors 2, the vehicle-side CAN connectors 3 and the vehicle-side torque sensor connectors 4 do not need to be doubled. Therefore, the components may be efficiently disposed in a limited space.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electronic control unit for redundancy of a motor driven power steering for a vehicle, the electronic control unit comprising:
    a first motor control circuit unit comprising a circuit structure configured to control an operation of a motor;
    a second motor control circuit unit comprising a circuit structure configured to control the operation of the motor, and disposed in parallel to the first motor control circuit unit along an x-direction;
    a redundancy control unit configured to control the second motor control circuit unit to perform a motor control, when an abnormality occurs in the first motor control circuit unit; and
    a double-layer power terminal part comprising a first side connected to a vehicle-side power connector and a second side diverging into double layers, extended in the x-direction, and connected to the first motor control circuit unit and the second motor control circuit unit.

2. The electronic control unit of claim 1, wherein the first motor control circuit unit comprises:
    a first circuit board configured to independently control the operation of the motor;

a first power terminal connection part disposed in a first area of the first circuit board, and connected to a power terminal part connected to a vehicle-side power connector to receive power;

a first communication terminal connection part disposed in a second area of the first circuit board, and connected to a Controller Area Network (CAN) terminal part connected to a vehicle-side CAN connector to receive a signal; and a first sensor terminal connection part disposed in a third area of the first circuit board, and connected to a torque sensor terminal part connected to a vehicle-side torque sensor connector to receive a signal.

3. The electronic control unit of claim 2, wherein the second motor control circuit unit comprises:

a second circuit board configured to independently control the operation of the motor;

a second power terminal connection part disposed on an x-direction extension line of a first area of the second circuit board, and connected to the power terminal part to receive power;

a second communication terminal connection part disposed on an x-direction extension line of a second area of the second circuit board, and connected to the CAN terminal part to receive a signal; and a second sensor terminal connection part disposed on an x-direction extension line of a third area of the second circuit board, and connected to the torque sensor terminal part to receive a signal.

4. The electronic control unit of claim 1, wherein the redundancy control unit comprises:

a circuit detection part configured to detect an operation state of the first motor control circuit unit;

an abnormality determination part configured to determine whether the first motor control circuit unit is abnormal, according to a signal detected by the circuit detection part; and a driving circuit switching part configured to stop the operation of the motor by the first motor control circuit unit, and perform circuit switching such that the second motor control circuit unit controls the operation of the motor, when the abnormality determination part determines that the first motor control circuit unit is abnormal, while the first motor control circuit unit controls the motor.

5. The electronic control unit of claim 4, wherein the circuit detection part comprises:

a first circuit detector configured to detect the operation state of the first motor control circuit unit; and a second circuit detector configured to detect an operation state of the second motor control circuit unit, wherein the abnormality determination part is configured to determine whether the first circuit detector is abnormal by comparing detection signals of the first circuit detector and the second circuit detector or by comparing the detection signal of the first circuit detector to a preset value.

6. The electronic control unit of claim 1, further comprising a motor coupling unit coupled to a motor housing, and disposed between the first motor control circuit unit and the second motor control circuit unit, wherein the motor coupling unit comprises:

a board support part fixed to the first motor control circuit unit and the second motor control circuit unit, and configured to receive heat radiated from the first motor control circuit unit and the second motor control circuit unit; and a heat radiation support part connected to the board support part, and configured to radiate heat received from the board support part.

7. The electronic control unit of claim 6, wherein the board support part comprises:

a support body part;

a first board support part disposed on a first surface of the support body part, such that the first motor control circuit unit abuts the first board support part;

a second board support part disposed on a second surface of the support body part, such that the second motor control circuit unit abuts the second board support part; and a terminal through-hole disposed through the support body part, such that a power terminal part connected to a vehicle-side power connector, a Controller Area Network (CAN) terminal part connected to a vehicle-side CAN connector, and a torque sensor terminal part connected to a vehicle-side torque sensor connector are extended through the terminal through-hole in the x-direction.

8. The electronic control unit of claim 6, wherein the board support part comprises:

a support body part;

a contact support part disposed on a first surface of the support body part, such that one of the first motor control circuit unit and the second motor control circuit unit abuts the contact support part; and a spacing support part protruding from the contact support part in the x-direction, and configured to support the other of the first motor control circuit unit and the second motor control circuit unit.

9. The electronic control unit of claim 1, wherein the double-layer power terminal part comprises:

an external power connection part connected to the vehicle-side power connector;

a first-layer power connection part extended from the external power connection part in the x-direction, and connected to one of the first motor control circuit unit and the second motor control circuit unit; and a second-layer power connection part extended in the x-direction from a position spaced apart from the first-layer power connection part, and connected to the other of the first motor control circuit unit and the second motor control circuit unit.

10. The electronic control unit of claim 9, wherein the first-layer power connection part protrudes in the x-direction from one side of the external power connection part, and comprises a first end connected to the first motor control circuit unit, wherein the second-layer power connection part comprises:

a power diverging part disposed on the external power connection part to protrude in one of a y-direction and a z-direction;

a power middle extension part extended in the other of the y-direction and the z-direction from the power diverging part; and a power extension end part extended in the x-direction from the power middle extension part, and comprising a first end spaced apart from the first end of the first-layer power connection part in the x-direction, the y-direction, and the z-direction.

11. The electronic control unit of claim 9, wherein the double-layer power terminal part comprises:

a first bus bar comprising the external power connection part, the first-layer power connection part, and the second-layer power connection part;
a second bus bar disposed symmetrically with the first bus bar in a y-direction; and
an intersection space defined between the first bus bar and the second bus bar, such that at least a part of a Controller Area Network (CAN) terminal part connected to a vehicle-side CAN connector is disposed in the intersection space.

12. The electronic control unit of claim 1, further comprising a double-layer sensor terminal part comprising a first side connected to a vehicle-side torque sensor connector and a second side diverging into double layers, extended in the x-direction, and connected to the first motor control circuit unit and the second motor control circuit unit,
wherein the double-layer sensor terminal part comprises:
an external sensor connection part connected to the vehicle-side torque sensor connector;
a first-layer sensor connection part diverging in the x-direction from the external sensor connection part, and connected to one of the first motor control circuit unit and second motor control circuit unit; and
a second-layer sensor connection part diverging in a y-direction or a z-direction from the external sensor connection part and extended in the x-direction, and connected to the other of the first motor control circuit unit and second motor control circuit unit.

13. The electronic control unit of claim 12, wherein the first-layer sensor connection part is disposed on a first side of the external sensor connection part to extend in the x-direction, and comprises a first end connected to the first motor control circuit unit,
wherein the second-layer sensor connection part comprises:
a sensor diverging part formed on a second side of the external sensor connection part to protrude in one of the y-direction and the z-direction;
a sensor middle extension part extended in the other of the y-direction and the z-direction from the sensor diverging part; and
a sensor extension end part extended in the x-direction from the sensor middle extension part, and comprising a first end spaced apart from the first end of the first-layer sensor connection part in the x-direction, the y-direction, and the z-direction.

14. An electronic control unit (ECU) for redundancy of a motor driven power steering for a vehicle for redundancy of a Motor Driven Power Steering (MDPS) for the vehicle, the ECU comprising:
a motor coupling unit coupled to a motor;
a first motor control circuit unit installed on the motor coupling unit;
a second motor control circuit unit installed on the motor coupling unit, and disposed in parallel to the first motor control circuit unit along an x-direction;
a power connector comprising a first side connected to a vehicle-side power connector and a second side connected to the first motor control circuit unit and the second motor control circuit unit; and
a redundancy control unit configured to control the second motor control circuit unit to perform a motor control, when an abnormality occurs in the first motor control circuit unit,
wherein the power connector comprises:
a double-layer power terminal part comprising a bus bar structure in which a first side thereof is connected to the vehicle-side power connector and a second side thereof diverges into double layers, extended in the x-direction, and connected to the first motor control circuit unit and the second motor control circuit unit;
a Controller Area Network (CAN) terminal part connected to a vehicle-side CAN connector; and
a first insert molding part configured to connect the double-layer power terminal part to the CAN terminal part through insert molding, and installed on the motor coupling part.

15. The electronic control unit of claim 12, wherein the CAN terminal part comprises a double-layer CAN terminal part comprising a bus bar structure in which a first side thereof is connected to the vehicle-side CAN connector and a second side thereof diverges into double layers, extended in the x-direction, and connected to the first motor control circuit unit and the second motor control circuit unit,
wherein at least a part of a first area in which the double layer power terminal part is disposed and at least a part of a second area in which the double-layer CAN terminal part is disposed cross or overlap each other.

16. The electronic control unit of claim 14, further comprising a torque sensor connector connected to a vehicle-side torque sensor connector,
wherein the torque sensor connector comprises:
a double-layer sensor terminal part comprising a bus bar structure in which a first side thereof is connected to the vehicle-side torque sensor connector and a second side thereof diverges into double layers, extended in the x-direction, and connected to the first motor control circuit unit and the second motor control circuit unit; and
a second insert molding part formed by insert molding the double-layer sensor terminal part, and fitted and installed into the motor coupling unit in the x-direction.

17. An electronic control unit for redundancy of a motor driven power steering for a vehicle, the electronic control unit comprising:
a first motor control circuit unit comprising a circuit structure configured to control an operation of a motor;
a second motor control circuit unit comprising a circuit structure configured to control the operation of the motor, and disposed in parallel to the first motor control circuit unit along an x-direction;
a redundancy control unit configured to control the second motor control circuit unit to perform a motor control, when an abnormality occurs in the first motor control circuit unit; and
a double-layer Controller Area Network (CAN) terminal part comprising a first side connected to a vehicle-side CAN connector and a second side diverging into double layers, extended in the x-direction, and connected to the first motor control circuit unit and the second motor control circuit unit.

18. The electronic control unit of claim 17,
wherein the double-layer CAN terminal part comprises:
an external CAN connection part connected to the vehicle-side CAN connector;
a second-layer CAN connection part extended in the x-direction from the external CAN connection part, and connected to one of the first motor control circuit unit and the second motor control circuit unit; and
a first-layer CAN connection part diverging in a y-direction or a z-direction from the external CAN connection part and extended in the x-direction, and connected to the other of the first motor control circuit unit and the second motor control circuit unit.

19. The electronic control unit of claim 18, wherein the second-layer CAN connection part is disposed on a first side of the external CAN connection part to extend in the x-direction, and comprises a first end connected to the second motor control circuit unit,
  wherein the first-layer CAN connection part comprises:
  a CAN diverging part formed on a second side of the external CAN connection part to protrude in one of the y-direction and the z-direction;
  a CAN middle extension part extended in the other of the y-direction and the z-direction from the CAN diverging part; and
  a CAN extension end part extended in the x-direction from the CAN middle extension part, and comprising a first end spaced apart from the first end of the second-layer CAN connection part in the x-direction, the y-direction, and the z-direction.

\* \* \* \* \*